US011969743B2

(12) United States Patent
Fischer

(10) Patent No.: US 11,969,743 B2
(45) Date of Patent: Apr. 30, 2024

(54) DISPENSER WITH VENTILATION FILTER

(71) Applicant: Friedrich Fischer, Wimsheim (DE)

(72) Inventor: Friedrich Fischer, Wimsheim (DE)

( * ) Notice: Subject to any disclaimer, the term of this patent is extended or adjusted under 35 U.S.C. 154(b) by 863 days.

(21) Appl. No.: 16/316,133

(22) PCT Filed: Jul. 12, 2017

(86) PCT No.: PCT/EP2017/067557
§ 371 (c)(1),
(2) Date: Jun. 21, 2021

(87) PCT Pub. No.: WO2018/019592
PCT Pub. Date: Feb. 1, 2018

(65) Prior Publication Data
US 2021/0308706 A1 Oct. 7, 2021

(30) Foreign Application Priority Data
Jul. 25, 2016 (DE) ..................... 10 2016 113 673.5

(51) Int. Cl.
*B05B 11/00* (2023.01)
*B05B 11/10* (2023.01)
(Continued)

(52) U.S. Cl.
CPC .... *B05B 11/00444* (2018.08); *B05B 11/1087* (2023.01); *B65B 3/027* (2013.01);
(Continued)

(58) Field of Classification Search
CPC ........... B05B 11/00444; B05B 11/1087; B05B 11/1074; B65B 3/027; B65B 3/04
(Continued)

(56) References Cited

U.S. PATENT DOCUMENTS 585,327 A * 6/1897 Guttenberg .......... B65D 47/061 222/482
922,453 A * 5/1909 Burgner ................... A47K 5/10 222/481
(Continued)

FOREIGN PATENT DOCUMENTS

CN 102802822 A 11/2012
DE 69816336 T2 12/1998
(Continued)

OTHER PUBLICATIONS

Indian Official Action (dated Mar. 20, 2002) for corresponding Indian Official Action 201817049308.
(Continued)

*Primary Examiner* — Paul R Durand
*Assistant Examiner* — Randall A Gruby
(74) *Attorney, Agent, or Firm* — WRB-IP PLLC

(57) ABSTRACT

A dispenser system for a pumpable dispensed product, in particular a cosmetic fluid dispensed product such as a washing lotion, a cream lotion, a perfume liquid or similar includes a rigid or pliable product container and a dispensing device with a pump apparatus. The pump apparatus includes at least one first valve group for conveying the dispensed product out of the product container. The pump apparatus includes a second valve group for feeding air into the product container, wherein the second valve group defines a feed duct in which at least one filter unit for filtering sterile air is arranged. In subsidiary aspect, a filter unit for the dispenser system as well as a manufacturing facility and a manufacturing method for the manufacture of the dispenser system are provided.

17 Claims, 8 Drawing Sheets

(51) Int. Cl.
*B65B 3/02* (2006.01)
*B65B 3/04* (2006.01)
*B65B 55/10* (2006.01)

(52) U.S. Cl.
CPC ................ *B65B 3/04* (2013.01); *B65B 55/10* (2013.01); *B05B 11/1074* (2023.01)

(58) Field of Classification Search
USPC ..... 222/189.09, 189.11, 321.1, 321.7, 321.8, 222/321.9
See application file for complete search history.

(56) References Cited

U.S. PATENT DOCUMENTS

| | | | | | |
|---|---|---|---|---|---|
| 1,167,420 | A * | 1/1916 | Marcuse | B05B 11/1074 222/340 |
| 4,694,976 | A * | 9/1987 | Schuetz | B05B 11/0044 55/467 |
| 5,110,052 | A * | 5/1992 | Graf | B05B 11/1023 239/333 |
| 5,752,627 | A * | 5/1998 | Vandromme | B05B 11/1023 222/137 |
| 5,927,559 | A * | 7/1999 | Bommer | B05B 11/0044 222/189.09 |
| 6,167,921 | B1 * | 1/2001 | Busick | B67D 3/0032 141/364 |
| 6,244,472 | B1 * | 6/2001 | Hennemann | B05B 11/00444 222/189.09 |
| 7,040,511 | B1 * | 5/2006 | Petit | B05B 11/1047 222/189.09 |
| 9,833,798 | B2 * | 12/2017 | Rymer | A61D 7/00 |
| 9,936,840 | B2 * | 4/2018 | Harris | B05B 11/1047 |
| 2005/0133544 | A1 | 6/2005 | Tadlock et al. | |
| 2015/0076176 | A1 * | 3/2015 | Ray | B05B 11/1001 222/189.11 |

FOREIGN PATENT DOCUMENTS

| | | | | | |
|---|---|---|---|---|---|
| DE | 10347466 | A1 | | 10/2003 | |
| DE | 102004050679 | A1 | | 10/2004 | |
| EP | 0193054 | A1 | | 2/1986 | |
| FR | 2368306 | A2 | | 5/1978 | |
| FR | 2669379 | A1 | | 11/1990 | |
| FR | 2891262 | A1 | | 9/2009 | |
| JP | S6049918 | A | | 9/1983 | |
| JP | H04013553 | U | | 2/1992 | |
| JP | 2002505639 | A | | 4/1998 | |
| JP | 2002347867 | A | | 5/2001 | |
| JP | 2007525252 | A | | 7/2004 | |
| JP | 2008273623 | A | | 9/2009 | |
| KR | 1020140131868 | | | 4/2014 | |
| KR | 1020140131868 | | * | 11/2014 | B05B 11/0037 |
| WO | 2009095337 | A1 | | 1/2009 | |
| WO | 2015038692 | A1 | | 9/2015 | |

OTHER PUBLICATIONS

International Search Report (dated Oct. 17, 2017) for corresponding International App. PCT/EP2017/067557.

Japanese Official Action (dated Mar. 20, 2016) for corresponding Japanese App. 2019-504957.

Chinese Official Action (dated Aug. 14, 2020) for corresponding Chinese App. 201780040997.5.

* cited by examiner

DISPENSER WITH VENTILATION FILTER

BACKGROUND AND SUMMARY

The invention relates to a dispenser system for a pumpable dispensed product, in particular a cosmetic fluid dispensed product such as a washing lotion, a cream lotion, a dentifrice, a pharmaceutical product, a perfume liquid or similar.

The invention furthermore relates to a filter unit for use in said type of dispenser system, as well as a manufacturing facility and a manufacturing method for the manufacture and filling of a dispenser system in accordance with the invention according to the preambles to the ancillary claims.

Dispenser systems which are freely available on the market, usually as soap dispensers, cream dispensers, dentifrice dispensers, perfume dispensers or the like are known from the prior art. Generic dispenser systems for medical/pharmaceutical products are also known in the medical and pharmaceutical field. As a rule, they comprise a product container in which either liquid or finely ground soap products, cream products, perfume or similar dispensed products are stored in liquid, cream-like, paste-like or granular form, and which can be released in measured doses with the aid of a pump or rotary mechanism. The pump or rotary mechanism is predominantly manually operable. Many such dispenser systems comprise a dispensing device that operates according to the principle of a plunger pump.

Many dispenser products, particularly in the field of bodily hygiene and cosmetics, but also in the medical/pharmaceutical field, are offered in packs in which a dispenser system is provided in order to be able to release the dispensed product in measured doses. These types of dispenser systems are thus particularly to be found in public spaces, but are also common in private areas in the form of small, freestanding containers able to contain up to 500 ml.

It is characteristic for dispenser systems of this type for the product container to comprise a thick-walled package using a large quantity of material, in distinct contrast to the liquid soap or liquid products for filling and replacement purposes packed in bags. Generic dispenser systems can, for example, be permanently mounted on a wall, or may be used also be used in a free-standing product container. Active cleansing substances, creams, cosmetic substances or perfume substances, which can usually be refilled using a refillable product container, may be contained in them.

In many cases, the known dispensing devices in dispenser systems comprise a pump apparatus that can convey the dispensed product in measured doses out of the product container through an outlet nozzle, where the quantity of dispensed product that is dispensed is replaced by an equal quantity of ambient air which flows back in so that a vacuum does not develop in the product container. Dispenser systems of this type are thus not usually airtight, so that ambient air can reach the dispensed product. Since ambient air contains germs and contamination, in particular in the moist atmosphere of a sanitary area, dispensed products of this type, in particular in the case of highly sensitive or biological dispensed products, have a limited shelf life, so that the risk of contamination with biological pathogens or chemical decomposition is averted. Preservatives are regularly introduced into such dispensed products to extend the period of usability, and should significantly increase the useful life of the dispensed product. These conservation agents are substances or mixtures that are used for conservation, i.e. long-term storage, and have an antimicrobial action due to biocides that effect an inhibition of growth or an extermination of microorganisms. In the cosmetic sector, in which soaps, creams, lotions and also perfume products are employed as dispensed products, parabens, benzoic acids or methylisothiazolinone are preferably employed as conservation agents. The approval is based on a cosmetic regulation, Annex 6, which governs what kinds of cosmetic ingredients may be used as conservation agents. Auxiliary materials intended to increase the useful life are also used for the conservation of medicaments in the pharmaceutical sector. In the absence of these, fungi and microorganisms can develop in the content, which can result in poisoning or extremely damaging side-effects when these dispensed products are used.

A pre-treatment of the dispensed products, for example by heating, desiccation or deep freezing, can scarcely be considered for the dispenser systems known from the prior art, since in daily use they continue to be in contact with air. Only artificial conservation agents can thus effectively lengthen the useful life of the dispensed products and thus provide a longer period of usability.

On the other hand, preservatives and conservation agents are also under suspicion of triggering allergies, in particular in the case of dispensed products that remain in contact with the human body for relatively long periods, for example creams, medicaments, perfumes and soap products. Skin damage and fungal disease can result. In their condition as shipped, such dispenser systems can still be sealed in an airtight manner, so that nothing external can reach the dispensed product through the ambient air. In regular use, however, ambient air is necessarily introduced into the product container of the dispenser system, so that an extension of the useful life can only be achieved by the addition of preservatives. Instead of parabens or other known conservation agents, alcohols or anisic acids can also be used, but these again can have side-effects. Butyl or propyl parabens, the subgroups of the methyl or ethyl parabens, are foodstuff-compatible, and approved according to the cosmetic regulations, but are however widely suspected of triggering allergies and of having side-effects. Metals such as aluminum or other metal additives are also used for conservation, and these again can trigger allergic reactions. Studies have shown a connection between deodorants containing parabens and the occurrence of breast cancer. Allergenic reactions have also been established in the case of sunscreens and shaving creams that contain such conservation agents. Maximum concentrations of about 0.19% in the dispensed product therefore apply, but these only have a minor effect on the shelf life of the dispensed product, and in many cases are exceeded.

A dispenser system comprising a dispenser device with a pump apparatus, wherein a filter foil is provided in the pump apparatus for inflowing air to filter contaminations out of the external air, is known from DE 10 2004 050 679 A1. The purpose of this is to lengthen the shelf life of the dispensed product. The feed duct for the air is however opened in both directions, so that a continuous and uncontrolled exchange of air takes place, wherein contaminated air can also reach the dispensed product through, for example, the outlet duct and the outlet nozzle. No reliable screening and filtering of the ambient air is ensured, and no separate pressurized air atmosphere can be generated in the interior of the product container. A one hundred percent filtering of external air cannot be guaranteed with the dispenser system proposed therein, so that in the end the stability of the dispensed product is only possible to a limited extent without the addition of conservation agents. Finally, a pressure compensation is not controlled by a valve apparatus, whereby it is also not possible for a positive pressure of sterile air to be generated.

DE 698 16 336 T2 discloses a dispenser system for the preparation and storage of a fluid product which should be stored in a sterile manner without the addition of conservation agents and protected from oxidization or contamination from the outside. The dispenser system comprises a container, a manual pump and the filter, with the use of standard dispensing pumps being possible. The pump is designed without an air intake, and the filter is arranged in an air inlet in the base of the container. The negative pressure generated in the container when the pump is actuated by a user can be compensated through this air inlet, with the external air passing through the filter. The filter can consist of or comprise a hydrophobic filtering material. Furthermore, a closing flap can be arranged between the filter and the interior volume of the container, so that no product stored inside the container can escape. It is mentioned here explicitly that this definitely does not require provision of a special pump with a complex structure. It is equally explicitly to be noted that use of standard dispensing pumps is possible. The air inlet is furthermore also arranged with the filter at the base surface of the container, and thus not in the area of the valve group of the pump apparatus. A positive pressure of sterile air in the product container cannot be generated by the double-pump system proposed there.

The standardization regulation VDMA 15390 2004-03-00—"Drucklufiqualität Liste" ("Compressed Air Quality Listing") represents a standard of the Verband Deutscher Maschinen und Anlagenbaus (VDMA—German Engineering Federation) and contains a list of recommended purity classes of compressed air quality according to the ISO 8573-1 standard. A list of recommended purity classes is given under Point 5, in which the classes H13 and H14 are contained; to that extent, purity classes are subject to standards regulation and listed in the said standard.

A dispensing apparatus for flowable material that can be stored in a container with a filling chamber is disclosed in EP 0 193 054 A1. The dispensing apparatus is suitable, for example, for being filled with and for the very long storage of disinfectants and similar medicaments, in which case a clean and hygienic filling is ensured in a simple manner. A trailer piston is guided inside the container. When in a filling position, this delimits the filling chamber, with at least one closable vent opening being provided in the region of the trailer piston in the filling position. This vent opening can be closed by a movement of the trailer piston from the filling position into the working position. The vent opening is thus closed immediately after the filling, in order to prevent the ingress of bacteria or the like. A riser tube can also be employed inside the container, so that the container can be filled through the riser tube from the bottom upwards. It is neither provided nor technically possible to generate or maintain a positive pressure of sterile air in the container.

FR 2 669 379 A1 discloses a dispensing valve that can be mounted on a non-pressurized container that is designed for liquid products. The dispensing valve here comprises a filter with which external air entering the container at each dispensing is cleaned. The valve comprises a first valve mechanism for the entry of the liquid into the dispensing chamber, and a second valve mechanism for controlling the dispensed quality that is supplied. The closing security of the valve is controlled by a third valve mechanism. Here again, no positive pressure can be generated in the container. The filter is arranged in the region in which the entire head with the dispensing valve is attached to the container, and thus cleans the air that inadvertently gets into the container in this connecting region. The valve group consisting of the first to the third valve mechanisms is only used to adjust the feed quantity of the flowable medium that is stored in the container. None of the valve mechanisms is designed for the supply of a positive pressure of sterile air into the container.

WO 2009/095 337 A 1 relates to a method for filling and evacuating a container for paste-like, foam-like or liquid media. The container here has in a pump receptacle a vacuum pump that seals the container against air entering from outside. The container can be manufactured in a blow-molding process out of the plastic hose, and is designed pliable. The vacuum pump prevents external air from entering the container when medium is dispensed from the container. A valve unit for setting a positive pressure of sterile air in the container is not disclosed.

DE 103 47 466 A1 indicates a medium conductor for a pump apparatus with at least one medium duct, an inlet opening and an outlet opening. A weight is arranged in the region of the inlet opening. The medium duct comprises at least one flexible bending section with a rigid duct cross-section. A deformation force is exercised on the medium conductor, depending on the spatial orientation, by the weight in the region of the inlet opening of the medium conductor. This ensures that in particular the inlet opening is immersed in the medium in almost all spatial orientations. It is thus possible for the medium to flow through the medium duct into the pump apparatus from different spatial orientations. A dispenser system with a plurality of valve groups and a positive pressure of sterile air in the product container is also not disclosed here.

The known prior art also suffers from the problems that without the addition of preservatives, a long-term storage of a dispensed product in a dispenser system is only possible by the addition of conservation agents, and that no leakage or unwanted ingress of contaminated ambient air is detectable.

The problem also arises that dispenser systems based on the known prior art comprise a product container that is designed rigid and thick-walled, and this entails a high consumption of materials and high costs.

Finally, the fact that allergies and harmful reactions that should be avoided can be triggered by the preservatives and conservation agents is a problem.

It is desirable to propose a dispenser system that permits long-term storage and use of a dispensed product without harmful conservation agents having to be added, where the product container can be designed with thin walls and the lowest possible material consumption. It is also desirable to propose a dispenser system that prevents or at least makes detectable an ingress of contaminated ambient air.

The subject matter of an aspect of the invention is a dispenser system for a pumpable dispensed product, in particular a cosmetic fluid dispensed product such as a washing lotion, a cream lotion, a perfume liquid or similar that comprises a rigid or pliable product container and a dispensing device with a pump apparatus. The pump apparatus comprises a first valve group for conveying the dispensed product out of the product container. It is proposed that the pump apparatus comprises a second valve group for feeding air into the product container, with the second valve group defining a feed duct in which at least one filter unit for filtering sterile air is arranged, so that a positive pressure of sterile air is settable in the product container.

In other words, a dispenser system is proposed in which a pump apparatus can convey a dispensed product out of a product container according, for example, to the principle of a plunger pump. The product container can be rigid, i.e.

consist of or comprise a self-stabilizing material, but can also be designed pliable, and be made of, for example, a plastic foil bag, rubber, latex or other material of soft form. The pump device has a first valve group which comprises one or more valves, mostly non-return valves, in order to dispense the dispensed product, usually with the aid of a conveying tube, out of the product container via an outlet nozzle. The quantity of dispensed product in the product container that is removed is replaced by a quantity of incoming air. A feed duct in which a second valve group with at least one second valve, in particular a non-return valve, is arranged is provided for this purpose, through which the air flows from outside into the product container in order to replace the quantity of dispensed product. The second valve group prevents the filtered air from being discharged backwards again out of the product container to the surroundings. A filter element is arranged in the feed duct either before, after or between multiple valves of the second valve group, through which element filtering of the ambient air takes place, so that a sterile, filtered and germ-free air, i.e. air that has been very finely filtered and is without bioreactive substances such as fungi, microorganisms or other contaminating particles, is introduced into the product container. The purpose of the second valve group is that the incoming sterile air can no longer escape along the same path out of the product container. A positive pressure of sterile air thus develops in the product container, so that even in the case of pliable product containers a rigid shape remains preserved by a positive pressure of introduced sterile air. Even pliable product containers are adequately self-stabilized. One advantage lies in the fact that as long as the positive pressure is visible in the product container, as is particularly the case with self-stabilized pliable product containers, it can be assumed that the sterility of the dispensed product remains assured. An indicator for the effectiveness of the dispenser system is thus provided, and the permanent coverage of the dispensed product with sterile air is indicated. Since no contaminated materials can enter the product container from the external air, the dispensed product no longer comes into contact with substances that are harmful to preservation, so that a practically unlimited useful life is provided for the dispensed product. The addition of preservatives and conservation agents can thus be omitted. It is possible in this way to offer biologically manufactured dispensed products such as creams, soaps, shampoos and the like, which cannot exhibit any harmful side-effects, since no conservation agents, parabens or other chemical preservatives or metal additives are contained. By the positive pressure in the atmosphere of sterile air, the pumping process is on the one hand simplified, since the dispensed product is forced by the high sterile air pressure to the outlet nozzle, so that the pumping effect of the pump apparatus for discharge can be minimized. On the other hand, there is no longer a risk that harmful ambient air can reach the dispensed product through the outlet duct, since no ambient air can enter due to the positive pressure. The positive pressure of sterile air disappears in the event of damage or leaks, so that the fastest possible consumption of the dispensed product is appropriate, since the atmosphere of sterile air is no longer present.

A crucial difference from the prior art is the fact that through the double-pump system it proposes, a positive pressure of sterile air can be generated in the product container; this cannot be achieved in the prior art known to date. As a result, a failure of the sterile air atmosphere, or an unwanted leak, is easily detectable, in addition to which pliable product containers in particular are always well-filled, have inherent stability and can be used, retaining their shape, until they are entirely empty.

This is because the crucial difference in accordance with the invention is that in the invention the two valve groups forming a double-pump system are provided for generation of a positive pressure, whereas in the prior art known to date a dispenser system for generating a positive pressure of sterile air is neither presented nor made obvious. In an advantageous development, the pump apparatus can be connected to the product container in an airtight manner, preferably permanently connected to the product container, and, when the dispensed product is not used, to maintain it tightly sealed and airtight from the surroundings. A permanent, airtight connection of the pump apparatus to the product container ensures that no ambient air can enter, either through threaded or other fastening locations between the pump apparatus and the product container. This increases the tightness of the dispenser system, and thus the useful life of the dispensed product, since no harmful external air can enter unfiltered. A refillability of the product container can nevertheless be provided, provided this can be released from the pump apparatus, for example using a special tool, under sterile air conditions. It is not however appropriate for a user to release the pump apparatus from the pump container him or herself, since as a result of the contact with external air, even if only brief, contamination of the dispensed product is already present.

In an advantageous development, the pump apparatus can be designed to introduce a volumetric quantity of sterile air into the product container that is equal to or greater than the volumetric quantity of the dispensed product to be supplied, so that a positive pressure is settable in the product container by sterile air. Preferably the pump apparatus is usually designed in such a way that it provides a double-pump action, in that the one hand the dispensed product is conveyed out of the product container via the outlet nozzle, and on the other hand air is introduced through the sterile filter element into the product container. It is proposed here that the volumetric quantity of sterile air that is introduced through the pump apparatus into the product container is greater than the volumetric quantity of the dispensed product to be conveyed, so that a positive pressure develops reliably in the product container. A self-stabilizing effect on a pliable product container develops as a result. In a borderline case, a quantity of sterile air is introduced into the product container equal to the dispensed product that is removed from the product container. It is conceivable that the pump apparatus is designed settable, so that the quantity of sterile air to be conveyed can be adjusted with respect to the quantity of dispensed product to be conveyed, in order to be able to set the positive pressure controllably. In this way an optimized sterile air atmosphere can be created in the product container. It is furthermore conceivable that the supply of sterile air takes place in the time before the conveyed removal of the dispensed product, whereby an excess quantity of sterile air assists the conveyed removal of the dispensed product by a compression pressure. This can be achieved by suitable mechanical measures, e.g. piston strokes at different speeds and different piston stroke mechanisms.

In one advantageous development, the filter unit, which is defined in the feed duct of the second filter group, is a sterile air filter with a filter class of H13, preferably H14 or class 100 or higher. Preferably the sterile air filter is designed as a HEPA filter (high-efficiency particulate arrestance filter) or ULPA filter (ultra-low penetration air filter), and furthermore the filter unit preferably comprises a labyrinth-type filter duct. Advantageously, the filter unit comprises a sterile filter, preferably an EPA/HEPA or a UPA filter unit with a filter class H13, preferably H14 or class 100 or higher. Particulate air filters that are particularly suitable for implementation of the invention are what are known as HEPA filters (high-efficiency particulate arrestance filters) or what are known as ULPA filters (ultra-low penetration air filters). Filters of these classes are used to filter viruses, respirable dusts, mite eggs or excrement, pollen, smoke particles, asbestos, bacteria, various toxic dusts or aerosols out of the air. These filters are usually used in medical technology, and can be used in accordance with the invention for the creation of sterile air, wherein ambient air is forced through the filter by fans or compression apparatus, and the particularate materials and contaminations contained therein can be filtered out. Filters with a filter class of H13 or higher achieve a separation efficiency of 99.95% for the overall airflow, while separation rates of at least 99.75% for particles of 0.1 μm to 0.3 μm can be achieved locally. According to the VDMA standard sheet "Compressed Air Quality" (List of Recommended Standard Classes according to ISO 8573-1) VDMA 15390 dated March 2004, filters that can completely filter out solid contaminations in the range from 1 μm up to 5 μm and only pass through contaminations of <1 μm in a range of 1-100 ppm are used for the preparation of sterile air for sterile air cover. Filters of this type ensure a required freedom from germs of the sterile air cover, so that the dispensed product has an extremely long useful life without additional treatment stages.

The pump apparatus is advantageously designed as a manually operable double-pump apparatus, and comprises a double-piston system for simultaneous conveying of the dispensed product and for introduction of the sterile air. A double-piston system is characterized by the fact that two pistons in two separate chambers are moved by one pump actuator, with the first valve group beings arranged in the first chamber and used to convey the dispensed product, while the second valve group is arranged in the second chamber and is used to transport the sterile air into the pump container. Sterile air and dispensed product are thus conveyed simultaneously into and out of the product container by a single piston actuator which is in mechanical contact with both cylinders of the double-pump apparatus. The two pistons can operate synchronously or with a time-lag, where the sterile air feed piston preferably moves before the product dispenser conveyor piston.

The pump actuator can integrate an outlet nozzle and be spring-mounted, or may be formed as a pistol grip, as is known from window cleaning products, for example. The pump actuator can comprise a protruding outlet piece with outlet nozzle, or may be formed with a cylindrical shape with an outlet nozzle integrated into the cylinder wall. A cylindrical pump actuator usually comprises a protective cap to prevent accidental actuation.

On the basis of the above configuration, the pump apparatus can advantageously be designed according to the principle of a scoop piston pump with a scoop piston, with the scoop piston comprising two piston segments, with a first piston segment for conveying the dispensed product and a second piston segment for supplying sterile air. Furthermore, the two piston segments are preferably designed concentricy and can be actuated by a single pump actuator in a structural unit with two separate piston chambers which are arranged one above the other or concentrically. In this implementation, it is proposed that a double-piston system following the principle of a scoop pump is provided, and both pump segments are driven in common by a single drive pump actuator cylinder in order to perform the conveying of dispensed product and the conveying of sterile air via the first and second valve groups respectively. The ratio of the size of the first piston segment to that of the second piston segment determines the positive pressure that can be set by the sterile air in the product container.

In an advantageous development, the second valve group comprises two, in particular three non-return valve units connected one after another in the feed duct. In principle, a single non-return valve unit is sufficient, but for better separation between the sterile air atmosphere in the product container and the surroundings, two or preferably three non-return valve units can be provided, where a first non-return valve unit can comprise one or more non-return valves arranged in parallel which can be arranged in front of a second piston segment, a second non-return valve unit can be arranged in the second piston segment, and a third non-return valve unit can be arranged after the second piston segment, so that an efficient sealing of the product container against the external air is permitted, and a higher positive pressure of sterile air can be maintained.

The filter unit can advantageously be arranged in the feed path from the external air to the first non-return valve unit. The valve unit is thus arranged in the immediate environment of the external air, which first flows through the filter unit before it passes through the first non-return valve into the interior of the piston system. It is possible in this embodiment for the filter unit to be exchanged, for example after long use, in order to permit an optimized filter effect and a long useful life, in particular for high-value dispensed products.

Alternatively, or also in addition, the filter unit, or a second filter unit, can be arranged between a first non-return valve unit and a second non-return valve unit, or between a second non-return valve unit and a third non-return valve unit of the second valve group. The filter unit can thus also be arranged in the feed duct at a different position, for example in the interior of the piston. In this way, it can be protected from damage, and can, for example, also be designed as a porous and mechanically delicate structure. If the filter structure is arranged in the interior, i.e. behind the first non-return valve unit, then it can advantageously comprise a labyrinth passage so that the path of the air to be filtered through the filter element is artificially lengthened in order to achieve the best possible filter effect. Integrated into the pump apparatus, a labyrinth passage can enable an increased filter effect thanks to the longer filter path as a result of the structural delimitation.

In an advantageous development, a non-return valve unit can be arranged in the pump apparatus in the outlet duct of the dispensed product in the region of an outlet nozzle. It is thus proposed that at least one non-return valve is arranged additionally in the outlet duct for conveying the dispensed product out of the product container at the outlet nozzle or in the outlet duct in the region of the outlet nozzle, so that a dispensed product that is already located in the outlet duct does not come into contact with harmful external air. The purpose of the non-return valve is that while the dispensed product can be dispensed outwards into the outlet nozzle, an ingress of air or other foreign materials from outside into the outlet duct can nevertheless be prevented. It is thus possible to ensure that even after a long period without use, the dispensed product that has already been conveyed and is located in the outlet duct does not come into contact with harmful external air and therefore can be kept for a long period, so that the quality of the first dispensing stroke of the dispensed product is assured even after a long period without use.

In an advantageous development, the product container is designed pliable and in particular as a foil container. Foil containers of plastic foil can be manufactured comparatively economically, and are in particular very easy to sterilize and to weld during manufacture, so that it can be ensured even at the processing stage that the product container remains sterile and closed. As a result of the positive pressure sterile air atmosphere in the product container, a full container of this type remains rigid, and has a low weight as well as low manufacturing costs. The foil container would lose its stability as a result of leaks, which is a sign that a dispensed product should be used up as quickly as possible, since the cover of sterile air is no longer ensured. Foil containers, or pliable product containers, are thus preferably suitable for the use of a dispenser system in accordance with the invention.

In a subsidiary aspect, a filter unit as presented above is proposed for use in a dispenser system, wherein the filter unit comprises a sterile air filter, in particular with a filter class of H13, preferably H14 or class 100 or higher. In particular, the sterile air filter is designed as a HEPA filter or as an ULPA filter. Filter units of this type can be retrofitted into a dispenser system in order to permit a long-term use of the dispenser system. The filter cleaning effect on the external air determines to a large extent the period of time for which the dispensed product is usable, where a sterile air filter of this type with a filter class higher than H13 or class 100 can provide a practically germ-free sterile air environment inside the product container. The filter unit can be fitted into the dispenser system as early as the manufacturing and filling process, or may also be inserted manually before the first use, so that it is also conceivable to use filter units in several dispenser systems one after another, and to design these exchangeably.

In a subsidiary aspect, a manufacturing facility for the manufacture and filling of a dispenser system described above is proposed, comprising at least a raw material tank, a processing tank and a storage tank for manufacture and storage of the dispensed product. The manufacturing facility further comprises a filling station for filling the dispensed product into the product container and for air-tight connection of the product container to the pump apparatus. It is proposed here that the supply of external air takes place through at least one sterile air pressure line to which at least one sterile air filtering apparatus is connected. In other words, a manufacturing facility for the manufacture of a dispensed product is proposed, in particular a medical, pharmaceutical, cosmetic or therapeutic dispensed product, which comprises a raw material tank for making raw material available, a processing tank in which the processing of the raw material into the dispensed product takes place and in which chemical or biological processes for the manufacture of the dispensed product proceed, and a storage tank in which the processed dispensed product is stored. A filling station is connected thereto, in which the product container is on the one hand sterilized, and on the other hand is filled with dispensed product and provided with the pump apparatus, with the pump apparatus being connected in an airtight manner to the product container. In the course of the process chain, external air is fed in, in order to provide a processing atmosphere both in the tank apparatuses and in the filling station. This processing atmosphere is prepared with sterile air, wherein at least one and in particular several sterile air filtering apparatuses are connected to the individual manufacturing stations, and this sterile air processing atmosphere is made available via a sterile air pressure line with a positive pressure of sterile air in the raw material tank, in the processing tank, in the storage tank and in the filling station. A hermetically closed manufacturing facility is thus made available, in which for the manufacture of a dispensed product only sterile air comes into contact with the raw materials, with the processed dispensed product during storage and processing, and during filling. If, furthermore, the product container is sterilized and only subjected to sterile air, then a dispensed product can be made available which is handled under sterile air conditions during its handling, in daily use, and during the manufacture, and into which no harmful germs can enter during manufacture or use In this way, theoretically unlimited shelf life can be achieved, even in the case of easily biologically perishable dispensed products. The risk of allergies and other harmful reactions to preservatives are avoided, and the highest quality dispensed products with a long shelf life can be made available.

In an advantageous development of the manufacturing facility, the filling station comprises a sterilizing apparatus for the product container, a filling apparatus and a pump fitting apparatus. In addition to the manufacture of the dispensed product under sterile air conditions, it is important that the product container is sterilized before being filled. In the case of a pliable product container, in particular a foil product container, this is very easily done by sterilization of the foils or of the pliable material. In the case of a rigid product container constructed, for example, of glass, ceramic, rigid plastic or similar materials, a comprehensive sterilization of the interior region of the product container can be performed. As a rule, a sterilization apparatus operates with ozone as the sterilization fluid or with another germicidal and cleaning oxidizing agent, where flushing of the sterilization agent out of the product container can subsequently take place using, for example, sterile air.

In an advantageous development of the filling station of the manufacturing facility, the filling apparatus can be designed to fill a product container that opens at the base, wherein the pump fitting apparatus is upstream, and the sterilization apparatus is arranged between the pump fitting apparatus and the filling apparatus, and is designed to carry out a sterilization of the open-base product container in an open position of the pump apparatus. A filling station for filling open-base product containers is thus proposed, which performs fitting of a pump apparatus under the cover of sterile air, after which a sterilization of the open-base product containers with the fitted pump apparatus is carried out, after which the dispensed product is filled and the base of the product container finally closed. The product container can be designed pliable, but preferably rigid. A container base can be pressed into the open base side of the product container, for example by the development of positive pressure, or the container base can be welded in or on, comparably to a tube of toothpaste. In this way, an effective sterilization and pump fitting, followed by filling, can be achieved, where a positive pressure of sterile air can be achieved in the product container by closing the container base.

Furthermore, in an advantageous development the manufacturing facility can comprise a sterilization apparatus which comprises a foil welding or foil deep-drawing unit for the manufacture of pliable product containers. A foil welding or foil deep-drawing unit which shapes the foils into sachets or bags into which the dispensed product is then filled, and which can be sealed in an airtight manner with a pump apparatus, can be arranged in the filling station when pliable product containers are manufactured.

In a further subsidiary aspect, the invention relates to a method for the manufacture of a dispenser system as is described above. The method comprises at least the steps of:

S1: providing raw material under the cover of sterile air;

S2: processing the raw material to create dispensed product under the cover of sterile air;

S3: storing the dispensed product under the cover of sterile air;

S4: filling the dispensed product into the dispenser system under the cover of sterile air.

The aforementioned method utilizes an embodiment of a manufacturing facility described above, where under complete cover with sterile air, the manufacture of the dispensed product from the raw material, through processing and storage up to filling takes place under cover of sterile air. The coverage with sterile air advantageously takes place at positive pressure, so that even in the presence of leaks no external air can enter from outside into the process, and only sterile air can escape. The sterile air can be created in a complete production hall or in individual, closable chambers or tanks, which have to be sealed hermetically from the external air. By the manufacture of dispensed product and a dispenser system of this type, a complete freedom from germs can be guaranteed, with a long shelf life of high-quality cosmetic products and dispensed products being enabled by simple sterile air measures without the need to introduce additives that extend the shelf life.

In an advantageous variant of the aforementioned manufacturing method, filling of the dispensed product in step S4 is achieved by the following filling steps:

M1: fitting of the pump apparatus onto an open-base product container (306);

M2: sterilization of the product container in an open position of the pump apparatus (18);

M3: filling the dispensed product in a locked position of the pump apparatus (18);

M4: closing the product container base;

M5: sealing the product container base.

A filling station is thus proposed in which a pliable or rigid product container with an open container base can be assembled under cover of sterile air in step M1, sterilized in step M2, and filled in step M3. In step M1, a pump apparatus with double-pump function is initially arranged on the upper side of the product container, and connected in an atmospherically sealed manner to the neck of the product container. The pump apparatus is then moved into an open position, for example by actuating the pump lever in step M2, so that fluid can pass from the interior of the product container through the pump system to the outlet nozzle of the pump actuator. A sterilization process, e.g. using ozone, sterilizes the inner walls of the product container and the interior of the pump apparatus through the open base opening of the product container. Ozone can be introduced under pressure through a sterilization apparatus and can flush the dispenser system during a sterilization period. During the sterilization period, the pump apparatus can be locked in a locked position in which the fluid path is blocked. Following this, a filling of the product container with a dispensed product through the base opening takes place in step M3. The container base is closed in step M4 after the filling process has been completed. In the concluding step M5, the container base is sealed in a pressure-tight manner by welding opposing edge regions of the container base or by pressing in a container base. If the container base is pressed in, sterile air, and potentially ozone, can also be enclosed and a positive pressure atmosphere established in the interior of the product container. The filling station can be arranged in a sterile air positive pressure atmosphere, wherein an ozone gas used for sterilization can be fed back again.

BRIEF DESCRIPTION OF THE DRAWINGS

Further advantages emerge from the drawings and the descriptions of the drawings below. Exemplary embodiments of the invention are illustrated in the drawings. The drawing, the description and the claims contain numerous features in combination. The person skilled in the art will expediently also consider the features individually and combine them to form useful further combinations.

Here.

DETAILED DESCRIPTION

Figure 1:
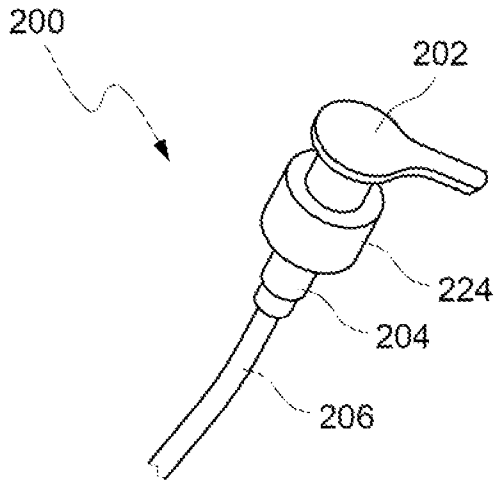
Fig. 1 (Prior Art)
FIG. 1 shows a dispensing apparatus of a dispenser system of the prior art.

The same reference numerals have been used to identify components that are identical or of the same type in the figures.

Figure 3:
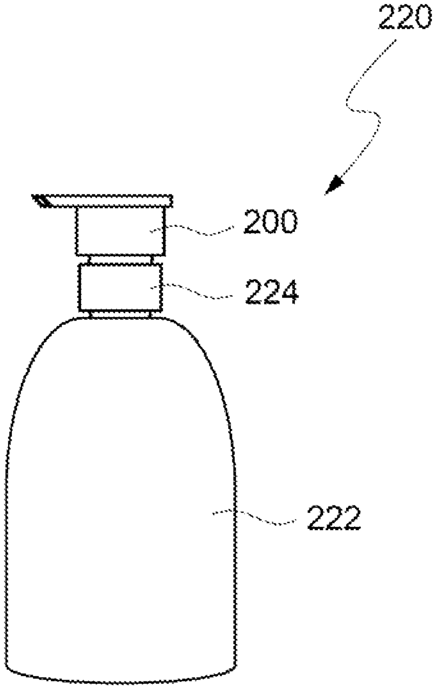
Fig. 3 (Prior Art)
FIG. 3 shows a dispensing apparatus with product container of the prior art.

FIG. 1 shows a dispensing device 200 of the prior art. The dispensing device 200 comprises a pump actuator 202, a pump unit 204 and a conveying tube 206. The dispensing device 200 is screwed onto a product container by means of a threaded seat 224, as is illustrated in FIG. 3. They dispensed product is guided by means of the conveying tube 206 out of the product container to an outlet nozzle by the pump unit 204. Due to the threaded seat 224, the dispenser system 220 with the product container screwed on cannot be made reliably air-tight, so that ambient air with the corresponding contamination can reach a dispensed product. For this reason, the dispensed product must have a long shelf life, even when in contact with air, which means that the addition of preservatives is unavoidable.

Figure 2:
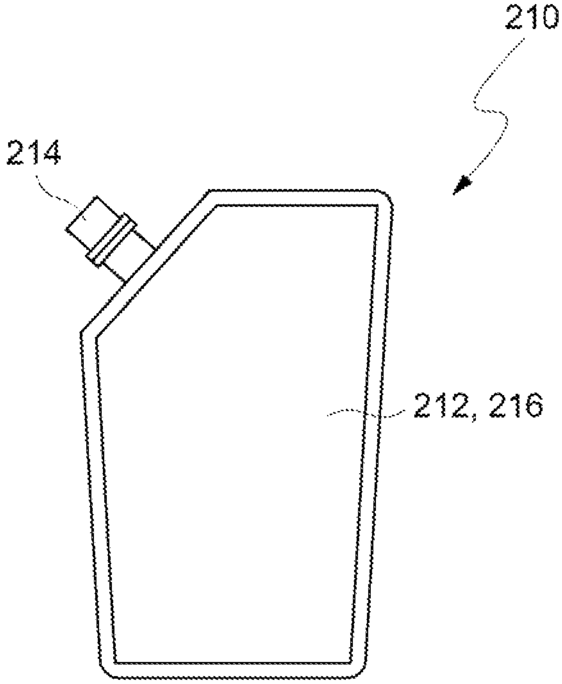
Fig. 2 (Prior Art)
FIG. 2 shows a pliable refillable product container of a dispensed product of the prior art.

A pliable product container 212 of a refill pack of a dispensed product from the prior art is shown in FIG. 2. The product container 212 is designed as a foil container 216, and has a screwed closure 214. Its purpose is so that the dispensed product can be refilled into a product container, like the product container 222 illustrated in FIG. 3, in order to provide a refillable dispenser system.

A dispenser system 220 of the prior art that uses a dispensing device 200 FIG. 1 is illustrated in FIG. 3. A rigid product container 222 is arranged at the threaded seat 224 of the dispensing device 200, in order to be able to release a dispensed product in measured doses. As a result of the removability of the dispensing device 200 and the product container 222, there is no airtight separation between the ambient atmosphere and dispensed product, so that conservation agents in the dispensed product must ensure an extended shelf life.

Figure 4:
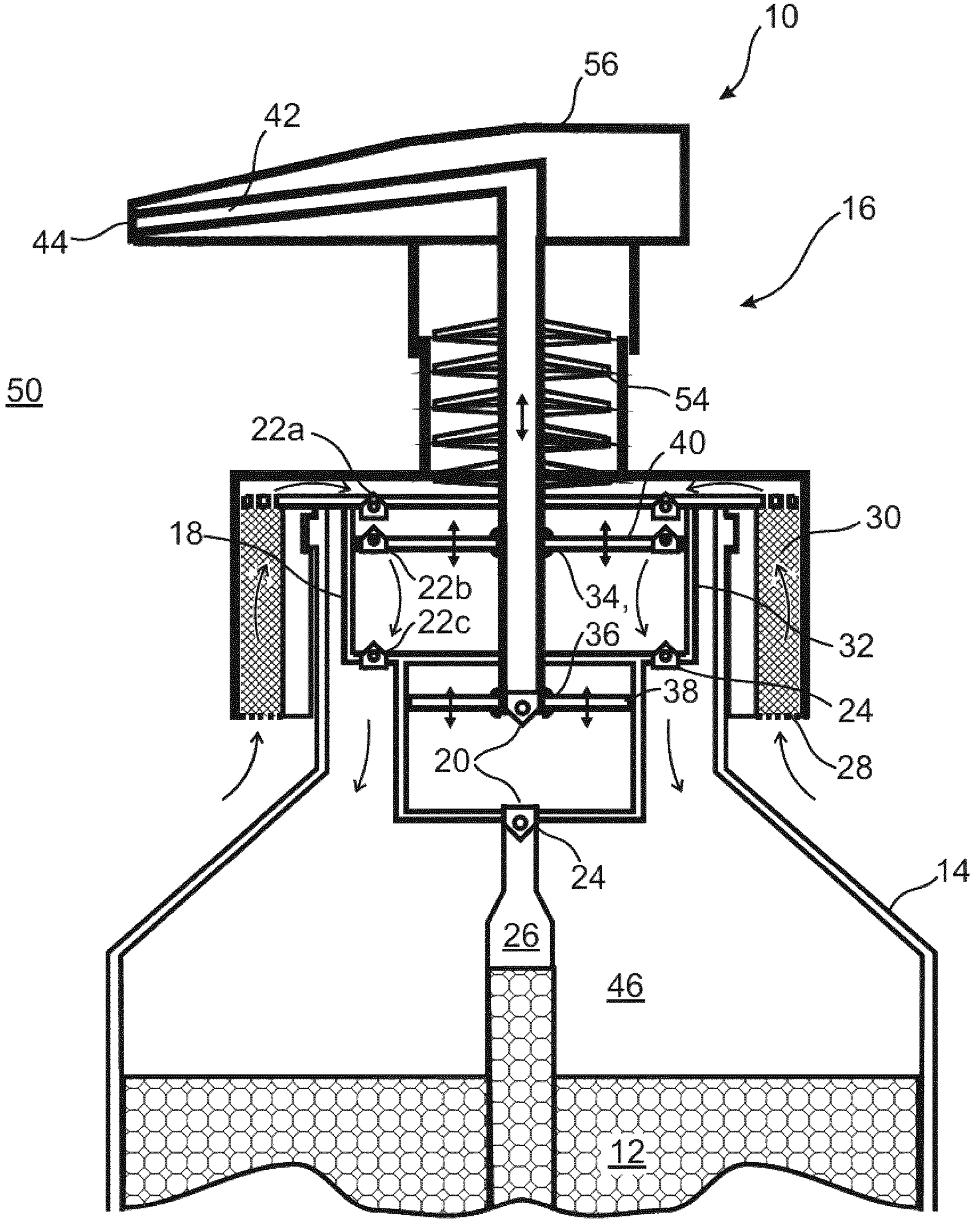
FIG. 4 shows a sectional view of a first exemplary embodiment of a dispenser system in accordance with the invention.

A section through an upper region of a dispenser system 10 of a first exemplary embodiment is illustrated in FIG. 4. The dispenser system 10 comprises a product container 14 which can be designed as, for example, a pliable foil container, or also as a rigid plastic, glass, ceramic or metal container. A dispensed product 12, for example a soap lotion, a cream lotion or an atomizable perfume, is stored in the interior of the product container. The dispenser system 10 comprises a dispensing device 16 which is connected in an airtight manner to the product container 14. The dispensing device 16 comprises a pump apparatus 18 with a double-pump system, in which a double-piston system 34 operating according to the principle of a scoop piston with a first piston segment 38 and a second piston segment 40 can both introduce sterile air into the product container 14 and simultaneously convey the dispensed product 12 via an outlet duct 42 to an outlet nozzle 44. The double piston system 34 is driven by hand by means of a pump actuator 56, with an automatic return to position taking place by means of a return spring element 54. On activation of the pump apparatus 18, manual pressure is applied to the pump actuator 56, whereby both the first pump segment 34 and the second pump segment 36 are moved downwards in a hermetically sealed chamber. The first pump segment 38 is used to convey the dispensed product 12 into the outlet duct 42. A first valve group 20, based on two non-return valve units 24, is provided for this purpose. The non-return valve units 24 let through the dispensed product upwards from below as a result of a negative pressure generated by the first pump segment 38, and prevent a return flow. A negative pressure is generated by raising and lowering the scoop piston 36 of the first piston segment 38, so that the dispensed product enters the piston chamber through a conveying tube 26, with the dispensed product passing into the outlet duct 42 of the pump apparatus 18 through the second non-return valve of the first valve group 20. A sterile air feed duct 28 feeds sterile air 46 into the interior of the product container 14 with the same stroke as that with which the dispensed product 12 is removed from the product container 14. Ambient air 50 is first introduced for this purpose via a filter unit 30 into the feed duct 28, and is brought into the interior of the product container 14 by means of a second scoop piston 36 of the second piston segment 40. Three non-return valve units 22*a*, 22*b* and 22*c* of the second valve group 22 are arranged for this purpose in the feed duct 28. Ambient air 50 flows through the filter element 30, through the first non-return valve unit 22*a*, into the upper region of the second pump segment 40. When the pump segment 40 moves upwards, this sterile air is moved through the non-return valve 22*b* into the lower region of the sterile air piston chamber, and when the second piston segment 40 moves downwards, this sterile air is introduced via the non-return valve unit 22*c* into the interior of the product container 14, as is illustrated by the arrows. The double-piston system 34 has dimensions such that with a piston stroke of the pump actuator 56, a larger volumetric quantity of sterile air 46 is introduced than the amount of dispensed product 12 conveyed into the outlet duct 42, so that the product container 14 is under positive pressure.

Figure 5A:
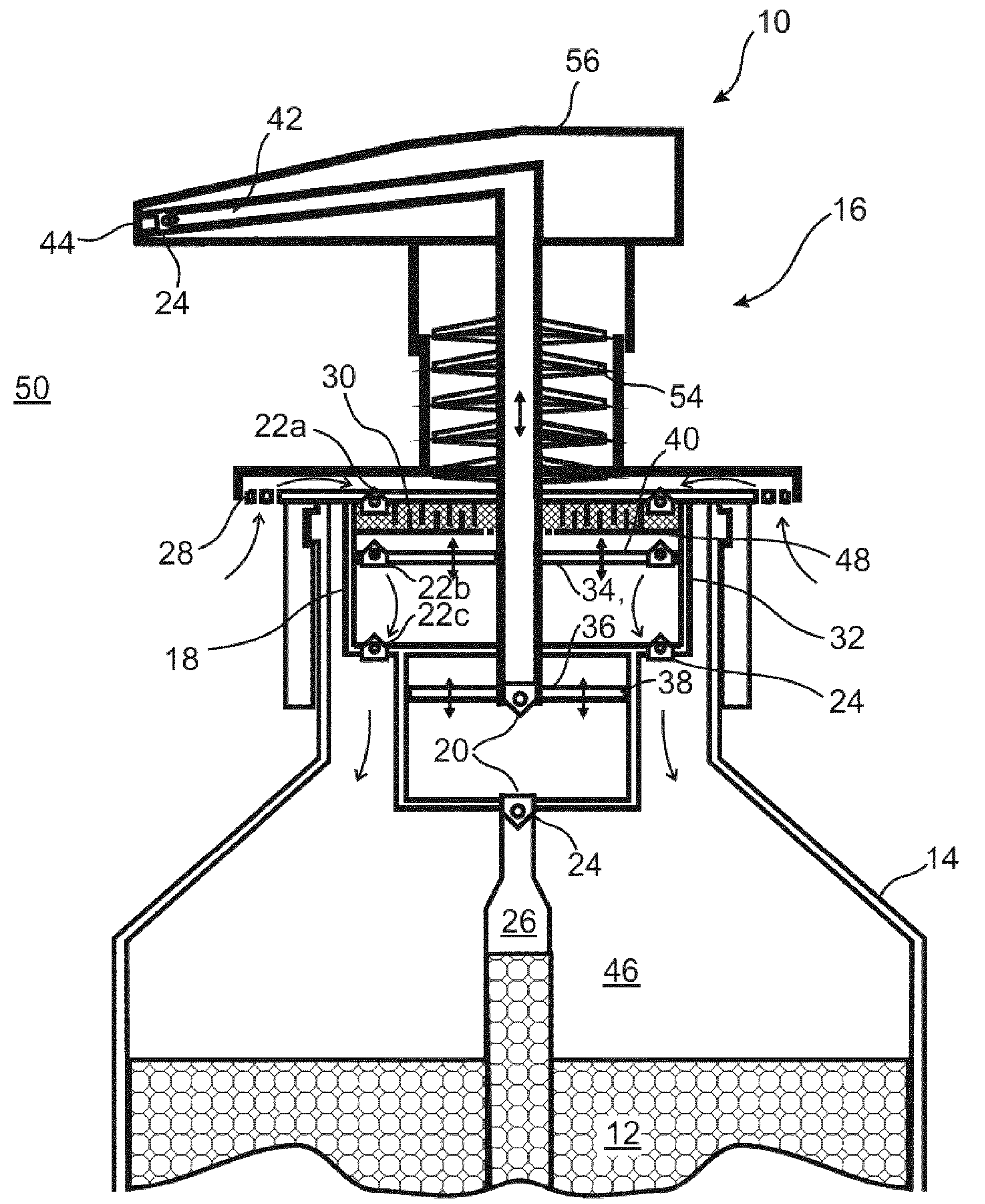
FIGS. 5*a*, 5*b* show sectional views of further exemplary embodiments of dispenser system in accordance with the invention.

FIG. 5*a* shows a second exemplary embodiment of a dispenser system 10. To a large extent this is identical in design to the exemplary embodiment according to FIG. 4. Them is however a difference from the first exemplary embodiment, in that the filter element 30 is arranged behind the first non-return units of the second valve group 22*a*, and is thus located in the interior of the sterile air pump chamber. Sterile air is introduced through the sterile air feed duct 28, and reaches the interior of the sterile air piston via the first non-return valve unit of the second valve group 22*a*, is passed via the second piston segment 40 downwards and through the second valve group 22*b* and finally through the non-return valve unit 22*c* into the interior of the product container. As the air passes through the filter element 30, it passes through a labyrinth passage 48, so that the transport path through the filter element 30 is lengthened in order to create an increased filtering effect. This is in particular advantageous with filter units 30 of limited size, since an improved filtering effect, and thereby a greater cleanliness of the sterile air, can be achieved through the longer filter path. In an embodiment of this type, the filter unit 30, in contrast to the exemplary embodiment illustrated in FIG. 4, cannot be exchanged, which allows a reduced physical size of the dispenser system 10 to be achieved. It is furthermore conceivable for additional filter elements to be arranged in front of the inlet to the feed duct 28, or also in the lower region of the pump chamber or at the outlet after the non-return valve unit 22*c*. In the exemplary embodiment illustrated in FIG. 5*a* a further non-return valve unit 24 is furthermore arranged in the region of the outlet nozzle 44 in the outlet duct 42. The effect of this is that no external air 50 can enter the outlet duct 42, so that a dispensed product that has been located in the outlet duct 42 for a long time does not come into contact with contaminated external air. A germ-free dispensed product can thus be provided at the first dispensing stroke even after a long period of storage and non-use, so that the risk of contamination or microbial infestation in the dispensed product is effectively prevented.

Figure 5B:
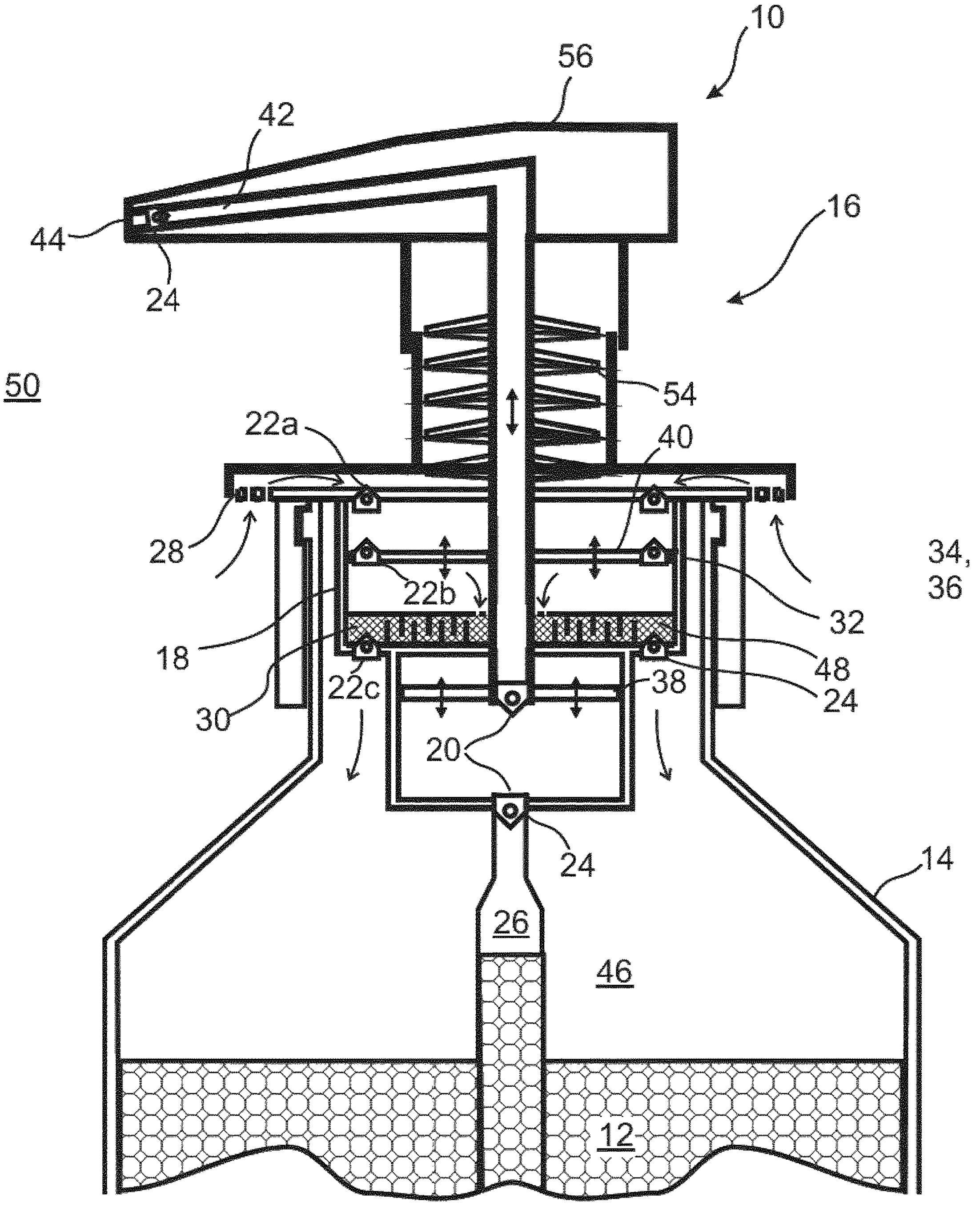

An embodiment modified from FIG. 5*a* is shown in FIG. 5*b*, in which the filter element is arranged at the inlet to the non-return valve unit 22*c*. Incoming air is thus not filtered until it crosses the second pump segment 40 in the pressurized region, so that pressurized air instead of drawn air is filtered here. In this way, an increased quantity of air can be conveyed through the filter unit 30 with a settable pressure. In other respects, this embodiment corresponds to the fourth embodiment illustrated in FIG. 5.

Figure 6:
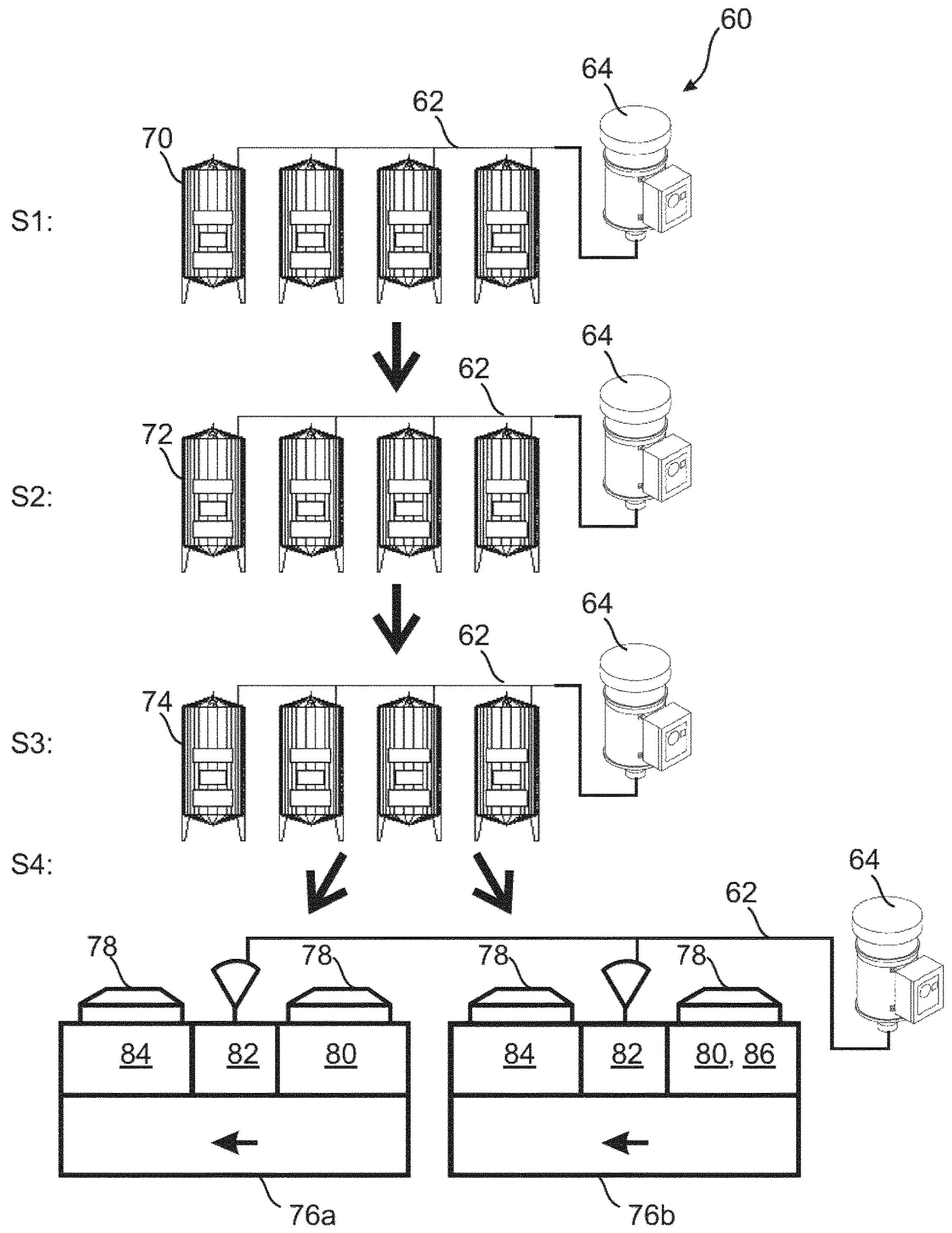
FIG. 6 shows schematically a manufacturing facility for the manufacture of a dispenser system in accordance with the invention.

FIG. 6 schematically illustrates a manufacturing facility 60 of an exemplary embodiment of the invention. The manufacturing facility 60 implements a four-stage manufacturing concept, wherein in step S1 initial materials can be stored in raw material tanks 70, in this case up to four raw material tanks. The necessary atmospheric supply with air takes place via a sterile air pressure line 62, wherein a sterile air filter apparatus 64, for example a Sterivent 500 sterile air filtering apparatus, can be provided upstream. Raw materials can thus be stored for a long time under cover of sterile air, and the contamination with microbes, fungi and toxic materials from the ambient air can be prevented. Raw materials can here in particular be water, EDA (ethylenediamine), amide, Purton CFD or other chemicals that can be used for the manufacture of cosmetics, creams, pharmaceutical products or medical products.

The raw material can be passed on, under cover of sterile air, to reactors in processing tanks 72, which may also be known as reactor tanks, in which the processing steps with physical and chemical processes take place, while sterile air can continue to be provided as a process atmosphere through a pressure line 62 from a sterile air filtering device 64. The dispensed product is manufactured in this process step S2, and is usually passed on in process step S3 for initial storage in storage tanks 74. Coverage with sterile air takes place again here, after which filling takes place in a filling station 76, wherein the dispensed product can be removed from the storage tanks 74.

Sterile air cover in the raw material tank 70 is not essential, since process temperatures of 85° C. or more prevail in the processing tanks 72, also known as reactor tanks, whereby biological contaminations at least are usually killed. Cooling down to room temperature at about 25° C. however takes place in the processing tanks 72. As a result of the cooling process, external air flows in to the processing tank(s) 72, so that there is a risk that contamination can enter the dispensed product 12 during cooling. Sterile air cover at a slight positive pressure above the normal atmospheric pressure is thus necessary at least following the processing stage of the processing tanks 72.

Two quite different embodiments can be considered as the filling station 76, namely a filling station **76*a* in which the rigid product containers can be filled, or a filling station 76*b*** in which the pliable product containers can be filled.

The filling station 76 is composed of various stations, for example having a blow-molding machine as the first stage in which the hot, and thereby sterile, raw material is formed into a bottle. A laminar flow sterile filter 78 with a mesh size of, for example, 0.45 μm can be arranged on the actual filling apparatus 82. Biocides range in diameter down to a minimum of 0.6 to 0.5 μm, and are therefore retained by the filter. A particle number in tanks secured in that way of 0.3 particles/milliliter is documented in the operating records. The dispensed product remains without any contact with unfiltered external air, from raw material through production to packaging.

A filling station **76*a* for rigid product containers comprises a sterilization apparatus 80 in which the product containers that have been manufactured are first cleaned and sterilized, after which the dispensed product is filled in a filling apparatus 82, and finally the dispensing device 16 is placed on the product container 14 and sealed in an airtight manner in a pump fitting apparatus 84. The connection between the product container 14 and the pump apparatus 18 is usually made in an inseparable manner, so that refilling the product container 14 is not possible. It can, however, also be provided that a refillable dispenser system 10 is made available, wherein refilling can, however, be carried out a sterile air cover. One possible design of a sterilization apparatus 80 for the sterilization of rigid product containers is shown in the following illustration in FIG. 7**.

A filling station **76*b* that is prepared for filling the dispenser product into pliable product containers can alternatively be operated in parallel or independently. The filling station 76*b* comprises for this purpose both a sterilization apparatus and a foil welding and foil deep-drawing unit 86. The foils to be welded are sterilized in the sterilization apparatus 80, for example by exposure to ozone, after which they are welded together or deep-drawn, so that a pliable product container is formed. A filling with the dispensed product then takes place under sterile air cover, followed by fitting of the dispensing device 16 to the product container 14 in the pump fitting apparatus 84**.

Sterile air cover can be achieved through a central sterile air pressure line 62 with a sterile air pressure line, or via one or more laminar flow filters 78 that can be arranged directly at the filling station 76.

Figure 7:
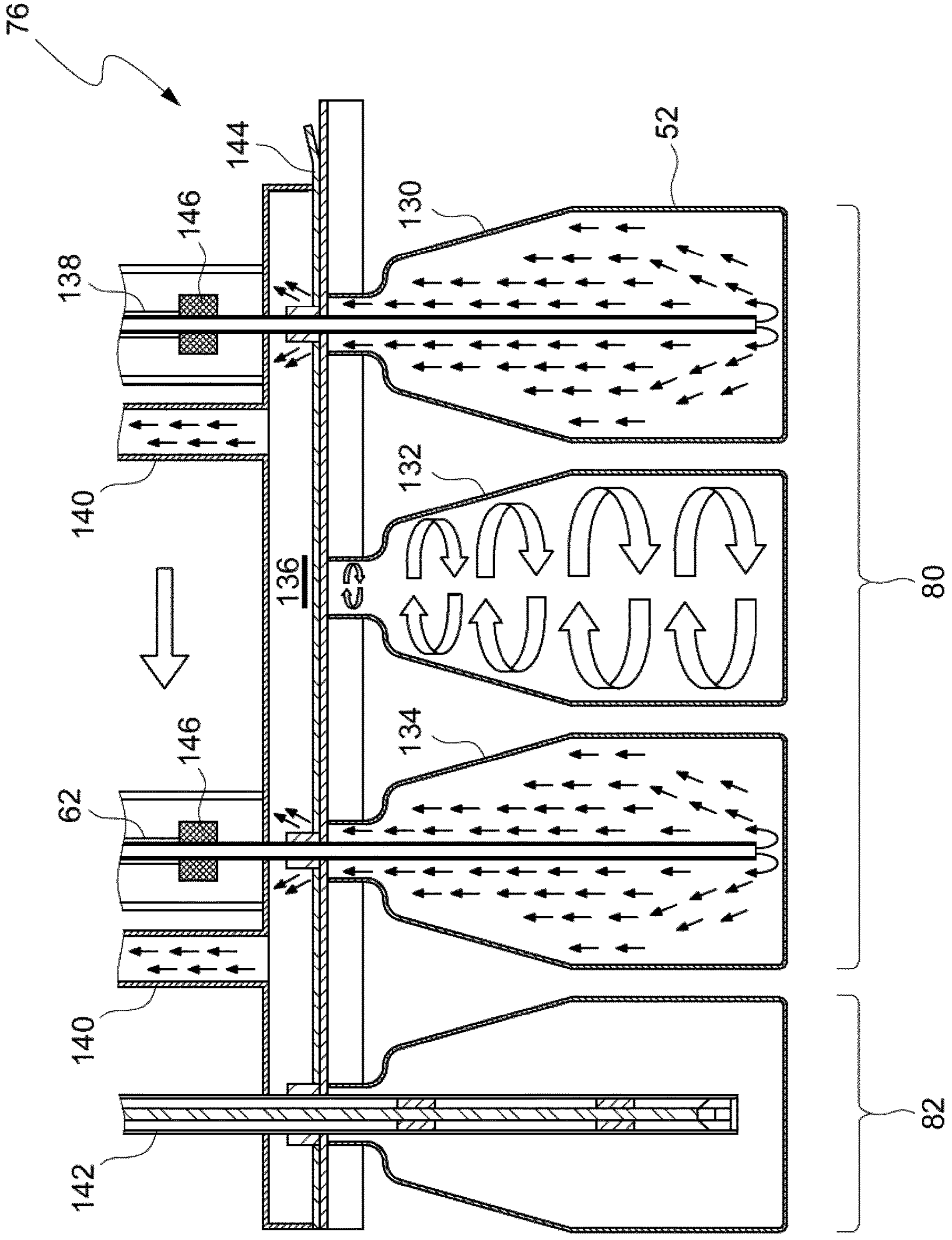
FIG. 7 shows schematically a sterilization unit for a filling station of a manufacturing facility for the sterilization of rigid product containers.

A part of a filling station 76 for filling rigid product containers 52 is illustrated in FIG. 7. A filling station 76 of this type can be used as a filling station **76*a* in a manufacturing facility according to FIG. 6. In the filling station 76, rigid product containers 52 are first sterilized in a sterilization apparatus 80 that consists of or comprises three different stages, and filled with dispensed product in a further filling apparatus 82. In the sterilization apparatus 80, a sterilization medium, for example ozone, is first introduced into the product container via a sterilization medium feed line 138, whereby a sterilization medium filling unit 130 is formed. The sterilization medium enters through a lance to the base of the product container 52, and flows at an open end into an exhaust air duct 136 in which the sterilization medium is withdrawn through exhaust air lines 140. The exhaust air duct 136 is sealed by a gasket 144 at the openings of the product container 52. In a further step of a sterilization process unit 132, the product container 52 is subjected to a sterilization process, for example by a mechanical treatment with the filter sterilization medium filling, and in a third step the sterilization medium is removed from the product container via a sterilization medium extraction unit 134 by filling, for example with sterile air, through a sterile air pressure line 62. A withdrawal of the sterilization medium and of the sterile air then takes place through an exhaust air duct 140. After this, the product container 52 leaves the sterilization apparatus 80 and reaches the filling apparatus 82. In the filling apparatus 82, a dispensed product filling line 142 is introduced through a lance, and the dispensed product is filled into the product container 52. Following this, a closure, not illustrated, of the product container 52 by a dispensing device 16** takes place, so that the dispenser system is manufactured.

Figure 8:
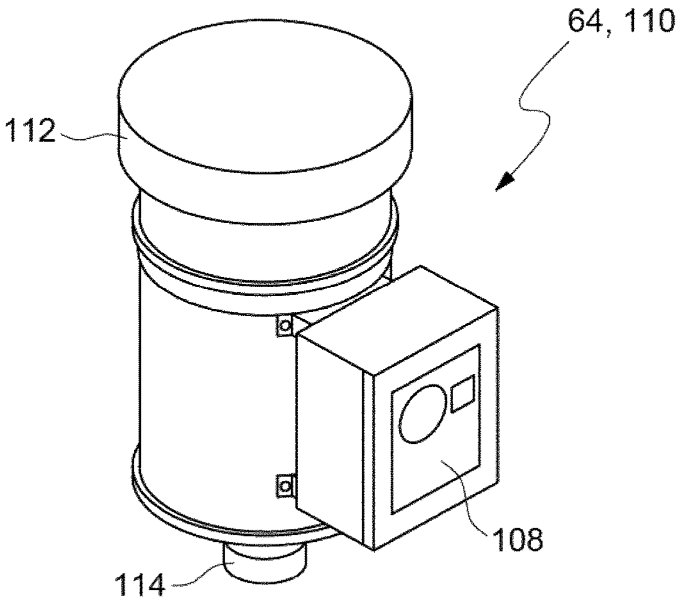
FIG. 8 shows in perspective a sterile air filtering apparatus for use in a manufacturing facility according to FIG. 6.

An embodiment of the sterile air filter apparatus 64 is illustrated in FIG. 8, being implemented as a sterile air provision apparatus 110 for the manufacture of a sterile air dispenser system 10. The sterile air provision apparatus 10 comprises an ambient air inlet region 112 with a labyrinth duct which can only receive a flow of air from underneath to protect against environmental influences and rain, and a sterile air outlet region 114 arranged on the opposite side, in which filtered sterile air is discharged. The filter equipment 110 is cylindrical in structure, and has at a section of the external wall an electrical sterile air pressure controller 108 in which operating elements and display elements for displaying the operating state plus, for example, an upcoming filter exchange, the current pressure, etc. are arranged.

Figure 9A:
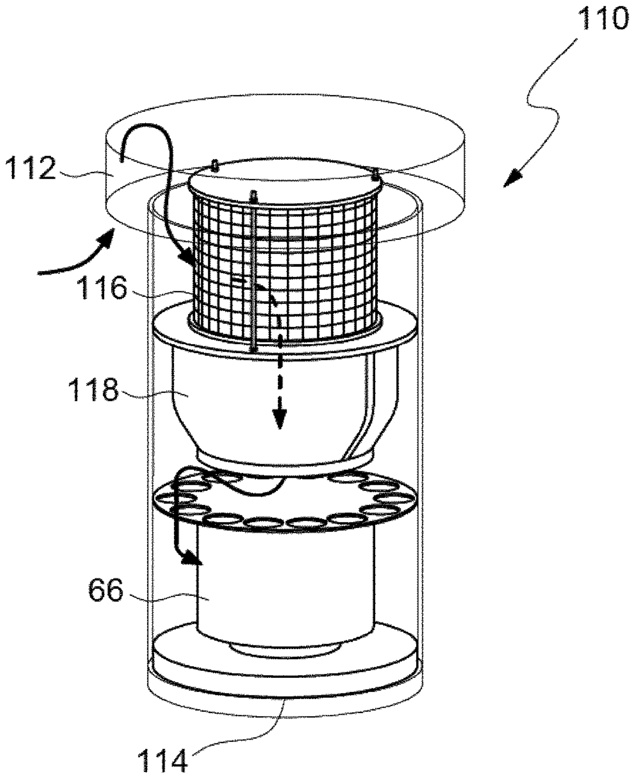
FIG. 9 shows a detailed view of the sterile air filtering equipment illustrated in FIG. 8.
Figure 9B:
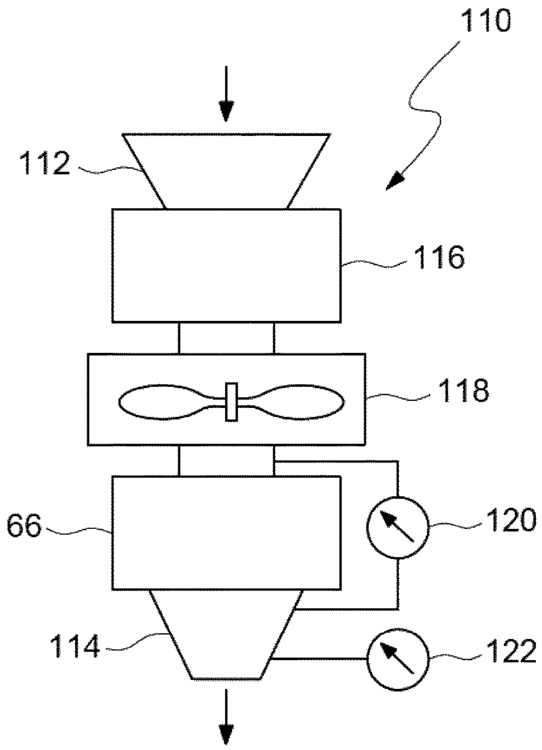

A perspective view of the internal design of the sterile air provision apparatus 110 illustrated in FIG. 8 is shown in FIG. **9*a*, while FIG. 9*b* shows the air guidance and the electrical components of the sterile air provision apparatus 110 as a schematic block diagram. Ambient air is guided through a labyrinth duct into an ambient air inlet region 112, and subjected to preliminary filtering through a preliminary filter unit 116. The preliminary filter unit can filter air at a flow speed of about 0.35 m/s, and filters coarse materials out of the air. A filter fan 118, which generates an air pressure and is used to establish a desired fluid flow of sterile air, is arranged behind this. The speed of the filter fan 118 is controllable, and can have a rated power between 100 W and 500 W, preferably 200 W, and an air throughput of up to 500 m3/h. A differential manometer 120, which can capture a pressure difference of the filter unit 66, is arranged at the outlet of the filter fan 118. The sterile filter unit 66 is a class 100 filter which does not allow more than 100 particles with a size of 0.5 μm per m3 of air to pass, and has an elimination factor of 99.997% of solid material. It is preferably formed as a HEPA filter or as a ULPA filter of class a H14 or higher. It has an active filter surface area of at least 5 m2, with the differential manometer 120 measuring the pressure drop across the filter 66, and this provides an indication of the degree of soiling, or of a fault or of correct functioning of the filter equipment. A further pressure manometer 122 which can determine the sterile air pressure within the sterile air pressure line 62 is finally arranged at the sterile air outlet region 114**, in order to monitor a sufficient sterile air cover.

Figure 10:
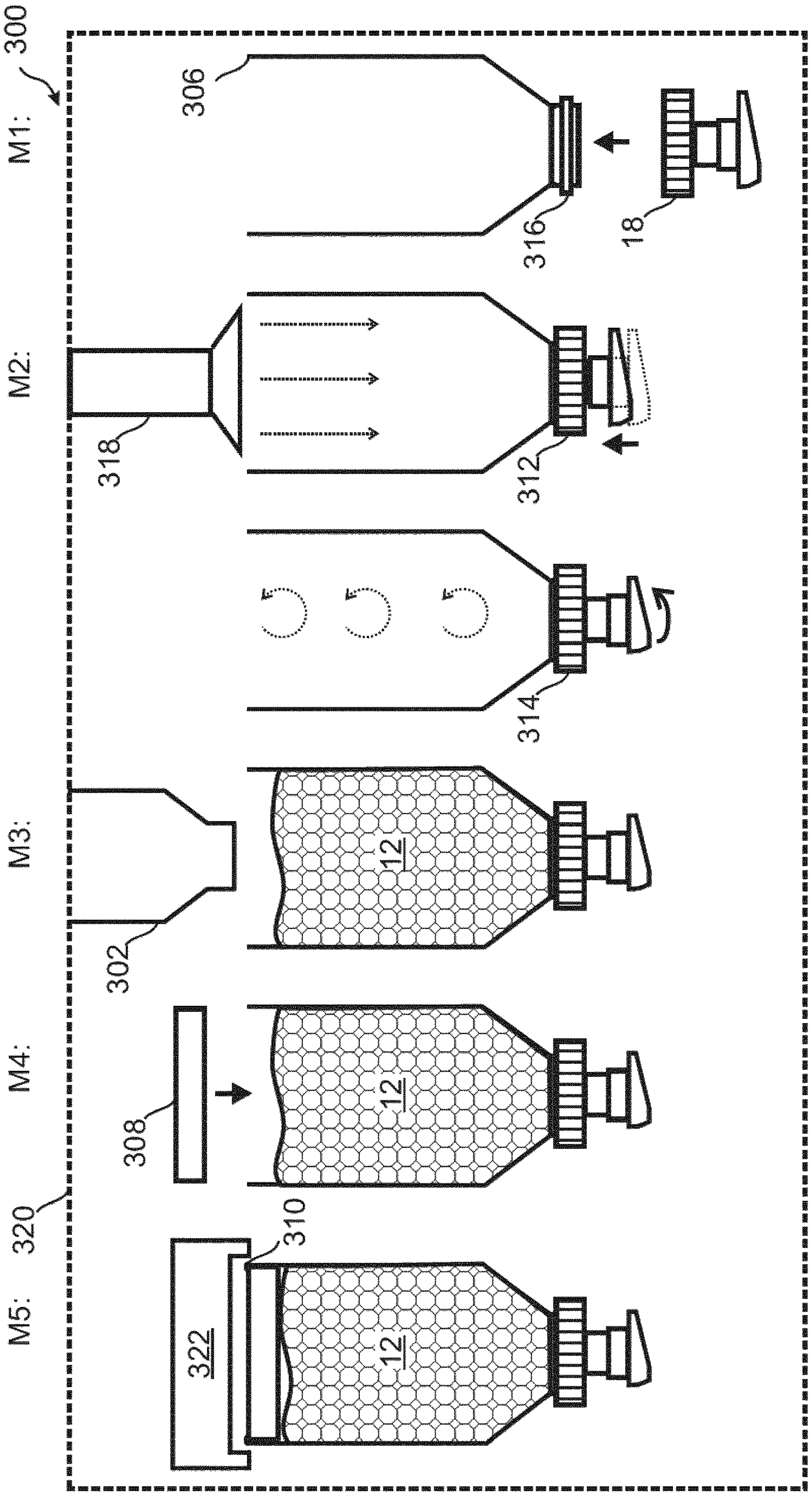
FIG. 10 shows an exemplary embodiment of the filling station according to an embodiment of the invention.

As an alternative to the filling station 76 illustrated in FIG. 7, a modified filling station 300 is shown in FIG. 10. The filling station 300 is arranged in a sterile air positive pressure container 320, in which there is a positive pressure of sterile air in order to prevent the ingress of external air into the filling station 300. In step M1, a pump fitting apparatus 304 fastens, in a pressure-tight manner, a pump apparatus 18 to the neck of a product container 306 with an open base, where for example a pressure-proof closure ring 316 on the product container 306 ensures a fluid-proof connection by means of a snap-lock connection and an optional welding of the seam. In step M2, a sterilization apparatus 318 introduces ozone as a sterilization gas from the open base side into the product container by means of a lance. The product containers are upside down during the filling process, so that the open base region of the product container 306 faces upwards. During the introduction of the ozone in step M2, the pump actuator 202 is moved into an open position 312, so that ozone can flow through the pump actuator mechanism and sterilize this too. Both the product container 306 and the pump apparatus 18 are sterilized in this way. The pump apparatus 18 is locked in a locked position 314 during a sterilization period, so that the fluid path is blocked. The duration of the sterilization period during which the ozone disinfects the interior of the product container 306 can be preselected. In the subsequent step M3, a dispensed product is introduced through the open base into the product container 306 by means of a filling apparatus 302. After this, the base opening is closed in a step M4, either by opposite side regions of the product container 306 being bonded together as in a tooth-paste tube, or by a product container base 308 being pressed into the base opening. The product container base 308 is adjusted in such a way that the product container 306 is gas-tight. Small amounts of sterile air or ozone can be trapped by the closure, and a positive pressure atmosphere is set in the interior of the product container 306. In the final step M5, welding of the product container 306 or of the base 308 by means of a base welding apparatus 322 takes place, forming a welded seam 310. The dispenser system is thus sterilized and free from germs, and filled under sterile air cover, so that no foreign materials can reach the dispensed product 12.

LIST OF REFERENCE NUMERALS

10 Dispenser system
12 Dispensed product
14 Product container
16 Dispensing device
18 Pump apparatus
20 First valve group
22 Second valve group
24 Non-return valve unit
26 Conveying tube
28 Sterile air feed duct
30 Filter unit
32 Double-pump apparatus
34 Double-piston system
36 Scoop piston
38 First piston segment
40 Second piston segment
42 Outlet duct of the dispensed product
44 Outlet nozzle of the dispensed product
46 Sterile air
48 Labyrinth-type filter duct
50 Surroundings
52 Rigid product container
54 Return spring element
56 Pump actuator
60 Manufacturing facility
62 Sterile air pressure line
64 Sterile air filter apparatus
66 Sterile air filter of a sterile air filter apparatus
70 Raw material tank
72 Processing tank
74 Storage tank
76 Filling station
78 Laminar flow filter
80 Sterilization apparatus
82 Filling apparatus
84 Pump fitting apparatus
86 Foil welding or foil deep-drawing unit
106 Sterile air compression tank
108 Sterile air pressure controller
110 Sterile air provision apparatus
112 Ambient air inlet region
114 Sterile air outlet region
116 Preliminary filter unit
118 Filter fan
120 Differential manometer
122 Pressure manometer
130 Sterilization medium filling unit
132 Sterilization medium processing unit
134 Sterilization medium extraction unit
136 Exhaust air duct
138 Sterilization medium feed line
140 Exhaust air line
142 Dispensed product filling line
144 Gasket
146 Transition seal
200 Dispensing device of the prior art
202 Pump actuator
204 Pump unit
206 Conveying tube
210 Dispensed product refill pack of the prior art
212 Pliable product container
214 Screwed connection
216 Foil container
218
220 Dispenser system of the prior art
222 Rigid product container
224 Threaded seat of the pump apparatus at the product container
300 Filling station
302 Filling apparatus
304 Pump fitting apparatus
306 Product container with open base
308 Product container base
310 Welded seam
312 Open position of the pump apparatus
314 Locked position of the pump apparatus

316 Pressure-proof closure ring
318 Sterilization apparatus
320 Sterile air positive pressure container
322 Base welding apparatus

The invention claimed is:

1. Dispenser system for a pumpable product, comprising a rigid or pliable product container and a dispensing device with a pump apparatus, wherein the pump apparatus comprises at least one first valve group for conveying the product out of the product container, as well as a second valve group for feeding air into the product container, wherein the second valve group defines a feed duct in which at least one filter unit for filtering sterile air is arranged and wherein the pump apparatus is arranged to introduce a volumetric quantity of sterile air into the product container that is greater than the volumetric quantity of the product to be supplied, so that a positive pressure of sterile air is settable in the product container by sterile air, wherein the pump apparatus is designed as a manually operable double-pump apparatus and comprises a double-piston system for simultaneous conveying of the product out of the product container via negative pressure and introduction of the sterile air into the product container via positive pressure, so that sterile air and product are conveyed simultaneously into and out of the product container by a single piston actuator.

2. Dispenser system according to claim 1, wherein the pump apparatus is connected to the product container in an airtight manner, preferably inextricably connected to the product container, and when not used the product is sealed in an airtight manner against the surroundings.

3. Dispenser system according to claim 1, wherein the filter unit comprises a sterile air filter with a filter class of H13 or class 100 or higher, and the filter unit comprises a labyrinth-type filter duct.

4. Dispenser system according to claim 1, wherein the pump apparatus is designed according to the principle of a scoop piston pump with a scoop piston, wherein the scoop piston comprises two piston segments, with a first piston segment for conveying the product and a second piston segment for supplying sterile air, and furthermore that the two piston segments are designed concentric.

5. Dispenser system according to claim 1, wherein the second valve group comprises at least two non-return valve units connected one after another in the feed duct.

6. Dispenser system according to claim 5, wherein the filter unit is arranged in the feed path from the external air to the first non-return valve unit.

7. Dispenser system according to claim 1, wherein a non-return valve unit is arranged in the pump apparatus in the outlet duct of the product in the region of an outlet nozzle.

8. Dispenser system according to claim 1, wherein the product container is pliable.

9. Dispenser system according to claim 8, wherein the product container is designed as a foil container.

10. Filter unit for use in a dispenser system according to claim 1, wherein the filter unit comprises a sterile air filter with a filter class of H13 or class 100 or higher.

11. Dispenser system for a pumpable product, comprising a rigid or pliable product container and a dispensing device with a pump apparatus, wherein the pump apparatus comprises at least one first valve group for conveying the product out of the product container, as well as a second valve group for feeding air into the product container, wherein the second valve group defines a feed duct in which at least one filter unit for filtering sterile air is arranged, so that a positive pressure of sterile air is settable in the product container, wherein the pump apparatus is designed as a manually operable double-pump apparatus and comprises a double-piston system for simultaneous conveying of the product and introduction of the sterile air, wherein the second valve group comprises at least two non-return valve units connected one after another in the feed duct, wherein the filter unit or a second filter unit is arranged between a first non-return valve unit and a second non-return valve unit or between the second non-return valve unit and a third non-return valve unit.

12. Manufacturing facility for the manufacture and filling of a dispenser system for a pumpable product, the dispenser system comprising a rigid or pliable product container and a dispensing device with a pump apparatus, wherein the pump apparatus comprises at least one first valve group for conveying the product out of the product container, as well as a second valve group for feeding air into the product container, wherein the second valve group defines a feed duct in which at least one filter unit for filtering sterile air is arranged, so that a positive pressure of sterile air is settable in the product container, wherein the pump apparatus is designed as a manually operable double-pump apparatus and comprises a double-piston system for simultaneous conveying of the product and introduction of the sterile air, the manufacturing facility comprising at least a raw material tank, a processing tank and a storage tank for manufacture of the product, as well as a filling station for filling the product into the product container and for connecting the product container to the pump apparatus in an airtight manner, wherein a supply of external air takes place through at least one sterile air pressure line to which at least one sterile air filtering apparatus is connected.

13. Manufacturing facility according to claim 12, wherein the filling station comprises a sterilization apparatus for the product container, a filling apparatus and a pump fitting apparatus.

14. Manufacturing facility according to claim 13, wherein the filling apparatus is arranged to fill a product container that opens at the base, wherein the pump fitting apparatus is upstream, and the sterilization apparatus is arranged between the pump fitting apparatus and the filling apparatus and is designed to carry out a sterilization of the open-base product container in an open position of the pump apparatus.

15. Manufacturing facility according to claim 13, wherein the sterilization apparatus comprises a foil welding or foil deep-drawing unit for the manufacture of pliable product containers.

16. Method for the manufacture of a dispenser system for a pumpable product, the dispenser system comprising a rigid or pliable product container and a dispensing device with a pump apparatus, wherein the pump apparatus comprises at least one first valve group for conveying the product out of the product container, as well as a second valve group for feeding air into the product container, wherein the second valve group defines a feed duct in which at least one filter unit for filtering sterile air is arranged, so that a positive pressure of sterile air is settable in the product container, wherein the pump apparatus is designed as a manually operable double-pump apparatus and comprises a double-piston system for simultaneous conveying of the product and introduction of the sterile air, comprising:

S1: providing raw material under cover of sterile air;
S2: processing the raw material to create product under the cover of sterile air;
S3: storing the product under the cover of sterile air;
S4: filling the product into the dispenser system under the cover of sterile air.

17. Method according to claim 16, comprising, in connection with the filling of the product in step S4, following the filling steps of:

M1: fitting of the pump apparatus onto an open-base product container;

M2: sterilization of the product container in an open position of the pump apparatus;

M3: filling the product in a locked position of the pump apparatus;

M4: closing the product container base;

M5: sealing the product container base.

* * * * *